(12) United States Patent
Wang et al.

(10) Patent No.: US 7,378,968 B2
(45) Date of Patent: May 27, 2008

(54) DETECTING THE POSITION OF AN RFID ATTACHED ASSET (75) Inventors: Hao B J Wang, Beijing (CN); Rong Yao Fu, Beijing (CN); Song Song, Beijing (CN); Xing Xin Gao, Beijing (CN); Zhe Xiang, Beijing (CN); Jian Huang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 203 days.

(21) Appl. No.: 11/210,925

(22) Filed: Aug. 24, 2005

(65) Prior Publication Data
US 2006/0055530 A1 Mar. 16, 2006

(30) Foreign Application Priority Data
Aug. 25, 2004 (CN) ............... 2004 1 0682488

(51) Int. Cl.
*G08B 13/14* (2006.01)
(52) U.S. Cl. .............. 340/572.4; 340/572.1; 340/539.13; 340/825.36; 340/825.49
(58) Field of Classification Search ........... 340/572.4, 340/539.13, 572.1, 825.49, 825.36; 707/10
See application file for complete search history.

(56) References Cited

U.S. PATENT DOCUMENTS

| | | | | |
|---|---|---|---|---|
| 5,686,902 | A * | 11/1997 | Reis et al. ................ | 340/10.2 |
| 6,342,839 | B1 | 1/2002 | Curkendall et al. ....... | 340/573.3 |
| 6,600,418 | B2 * | 7/2003 | Francis et al. ........... | 340/572.1 |
| 6,608,551 | B1 | 8/2003 | Anderson et al. ........ | 340/10.51 |
| 6,693,512 | B1 | 2/2004 | Frecska et al. ........... | 340/10.1 |
| 6,693,539 | B2 | 2/2004 | Bowers et al. ........... | 340/572.1 |
| 7,044,373 | B1 * | 5/2006 | Garber et al. ............. | 235/385 |
| 7,142,120 | B2 * | 11/2006 | Charych et al. ......... | 340/572.4 |
| 7,161,470 | B2 * | 1/2007 | Berquist et al. ......... | 340/10.31 |
| 2001/0008390 | A1 | 7/2001 | Berquist et al. ......... | 340/10.31 |
| 2002/0170969 | A1 | 11/2002 | Bridgelall ............... | 235/462.13 |
| 2003/0189488 | A1 | 10/2003 | Forcier et al. ........... | 340/572.1 |
| 2003/0195904 | A1 | 10/2003 | Chestnut et al. ........ | 707/204 |
| 2003/0214387 | A1 | 11/2003 | Giaccherini ............. | 340/10.1 |
| 2003/0236590 | A1 | 12/2003 | Park et al. ............... | 700/245 |
| 2004/0067734 | A1 | 4/2004 | Gunnarson .............. | 455/41.2 |
| 2005/0076034 | A1 * | 4/2005 | Addonisio et al. ...... | 707/10 |

FOREIGN PATENT DOCUMENTS

JP 2004-059320 2/2004

* cited by examiner

*Primary Examiner*—Toan Pham
(74) *Attorney, Agent, or Firm*—Lily Neff (57) ABSTRACT

Provides asset position detecting apparatus and methods for determining the correspondence relation between an asset attached to an RFID tag and the position in which the asset is located in a predetermined space range. An example apparatus includes: a movable RFID reader movable in the space range, for detecting whether the asset exists in its read range, and reading the RFID tag attached to the asset within its read range, to obtain the specific identification of the detected asset; and position determining means for determining the position where the reader is located, wherein, when said RFID reader detects that said asset exists in its read range during its movement, the obtained identification of the asset and the current position of the RFID reader are associatively stored in a database, so as to obtain the information regarding the position of said asset.

20 Claims, 4 Drawing Sheets

DETECTING THE POSITION OF AN RFID ATTACHED ASSET

FIELD OF THE INVENTION

The present invention relates to an asset position detecting apparatus, an asset position detecting method, and more particularly to an apparatus and method for detecting the position of an asset attached to an RFID (Radio Frequency Identification) tag.

BACKGROUND OF THE INVENTION

Assets management is required in many fields. A very important function of asset management is to locate and track the assets. For example, in warehouses, accurate location of the stored assets accelerates carrying goods in and out. In libraries, assistants need to know the location of the books and be aware timely when some books are placed on the wrong shelf. In retail stores, shop assistants need to find out the goods placed at the wrong places by customers and put the goods back to the position where they ought to be. If these problems of asset management can be well solved, the efficiency, responsivity and customer satisfaction will be improved and the cost of time and human resources will be reduced.

Recently, the enthusiasm for RFID solutions has been ignited by the RFID 2005 mandatory deadline set by Wal-Mart and US Department of Defense. Because of the requirement by the market and the many merits in technology, RFID solutions are increasingly regarded as the best choice for assets management. In a common configuration, an RFID tag is attached to each asset, some RFID readers are installed at some fixed key positions to monitor if any RFID-tagged assets passing by. The backend computer system collects the information from RFID readers to infer where the asset is. Some basic scenarios are, the RFID readers are installed at the check-in and check-out counters in libraries to monitor books' lending out and returning in, or the RFID readers are installed at the gate of warehouse and the check-out counters in retail stores to track the goods in and out. All these configurations can provide coarse-granularity assets management ability for tracking if an asset is in a room, but they can not provide the information regarding the exact location of the asset within the room.

Figure 1:
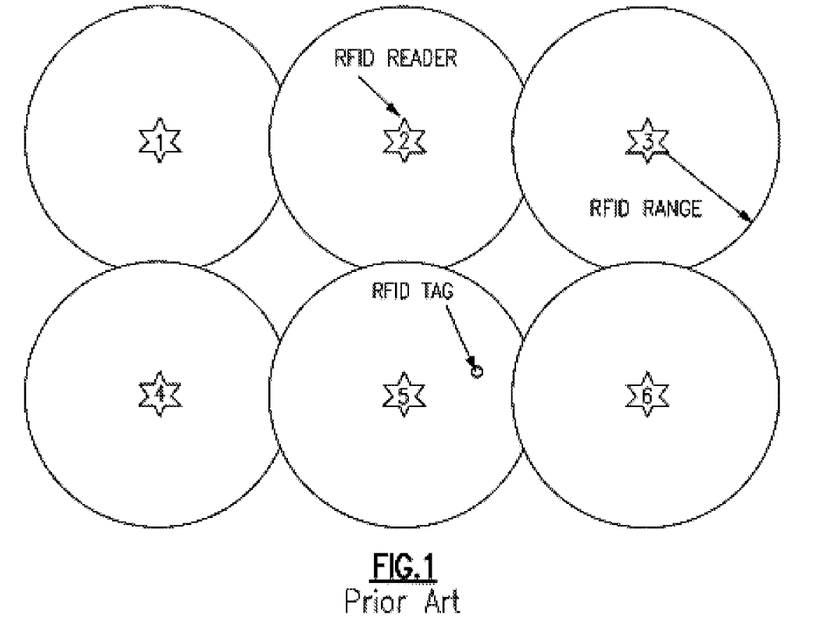
FIG. 1 shows a conventional asset position locating approach, in which a matrix of RFID readers are installed at some fixed positions.

In order to be capable of positioning an asset in a physical space, some approaches have been proposed. A typical approach is shown in FIG. 1, in which a matrix of RFID readers are installed at some fixed positions. The position of each reader is recorded in advance. When an RFID-tagged asset is within the read range of an RFID reader, it can be detected by the reader. After the reader notifies the backend computer system of its detecting this RFID tag, the asset is associated with the location covered by the reader.

The approach shown in FIG. 1 can locate an asset within a physical space; however the cost of this solution is very high. For RFID tags and readers commonly used in warehouses, libraries and retail stores, the read range of an RFID reader is about 1-1.5 meters. Even if we approximate the coverage area of a single reader as big as $3*3=9$ m$^2$, for a warehouse of 1000 m$^2$, there would require more than 100 readers installed to locate an RFID-tagged asset. This is very expensive because:

1. RFID readers are quite expensive per se; an RFID tag may cost less than 50 cents, but a common reader with a read range of 1 meter could cost several hundred dollars; and 2. The workload for installing the matrix of the readers, providing power supply and connecting them to the backend computer system is very heavy and requires many deployment skills.

Thus, RFID technology provides an easy-to-use way for assets management, however, due to cost consideration, fixed reader solutions can only provide coarse-granularity location information of an asset currently.

U.S. patent application US 2003/0214387 and U.S. Pat. No. 6,693,512 respectively describe a system for locating assets by using a portable apparatus, but because they are only used to seek particular objects and do not contain a locating module, they can only seek a particular object once, and cannot associate all assets with their positions. Whenever a user needs to seek a particular asset, he/she must search for the entire physical space over again.

U.S. patent application US 2003/0236590 describes an RFID coordinate system for recognizing the position and direction of a mobile unit, in which an RFID reader is installed on a mobile robot and RFID tags representing the position of themselves are deployed at a plurality of fixed positions in the robot moving area. The position of the robot is obtained by the RFID reader detecting the RFID tags. However, this is only "one-way" positioning, in which the RFID reader detects only which position the robot moved to, but do not detect which assets are placed at the position.

SUMMARY OF THE INVENTION

Thus, a general aspect of the present invention is to provide an inexpensive and effective asset position detecting apparatus and method based on RFID technology. According to a particular aspect of the present invention, an asset position detecting apparatus is provided to determine the correspondence relation between an asset attached to a radio frequency identification tag and the position in which the asset is placed within a predetermined space range.

An example of an asset position detecting apparatus includes: a movable radio frequency identification reader which is movable in said predetermined space range, for detecting whether said asset exists in its read range, and reading the radio frequency identification tag attached to the asset within its read range, to obtain the specific identification of the detected asset; and a position determining means for determining the position where said radio frequency identification reader itself is located, wherein, when the radio frequency identification reader detects that said asset exists in its read range during its movement, the obtained identification of said asset and the current position of said radio frequency identification reader are associatively stored in an internal or external memory, so as to obtain the information regarding the position of said asset.

According to another aspect of the present invention, an asset position detecting method is provided to determine the correspondence relation between an asset attached to a radio frequency identification tag and the position in which the asset is placed within a predetermined space range. An example of a method includes: using a movable radio frequency identification reader which is movable in the predetermined space range to detect whether the asset exists in its read range; when the radio frequency identification reader detecting that the asset exists in its read range during its movement, reading, by the radio frequency identification reader, the radio frequency identification tag attached to the asset in its read range to obtain the specific identification of the detected asset; determining the position of the radio frequency identification reader; associatively storing the obtained identification of the asset and the current position of the radio frequency identification reader, so as to obtain the information regarding the position of the asset.

Thus, asset position detecting apparatus and methods according to the present invention can use a small number of radio frequency identification readers to detect the exact positions of all the assets to be managed in the predetermined space. After this detecting process, users can learn the association between the asset and its position by inquiring the database.

BRIEF DESCRIPTION OF THE DRAWINGS

For a more complete understanding of the present invention and the advantages there of, reference is now made to the following description taken in conjunction with the accompanying drawings, in which.

DETAILED DESCRIPTION OF THE INVENTION

The present invention provides inexpensive and effective asset position detecting apparatus and methods based on RFID technology. According to an example embodiment of the present invention, an asset position detecting apparatus is provided to determine a correspondence relation between an asset attached to a radio frequency identification tag, and the position in which the asset is placed within a predetermined space range. The asset position detecting apparatus includes: a movable radio frequency identification reader which is movable in the predetermined space range, for detecting whether the asset exists in its read range, and reading the radio frequency identification tag attached to the asset within its read range, to obtain the specific identification of the detected asset; and a position determining means for determining the position where the radio frequency identification reader itself is located, wherein, when the radio frequency identification reader detects that the asset exists in its read range during its movement, the obtained identification of the asset and the current position of the radio frequency identification reader are associatively stored in an internal or external memory, so as to obtain the information regarding the position of the asset.

According to another example embodiment of the present invention, an asset position detecting method is provided to determine the correspondence relation between an asset attached to a radio frequency identification tag and the position in which the asset is placed within a predetermined space range. A method includes the steps of: using a movable radio frequency identification reader which is movable in the predetermined space range to detect whether the asset exists in its read range; when the radio frequency identification reader detecting that the asset exists in its read range during its movement, reading, by the radio frequency identification reader, the radio frequency identification tag attached to the asset in its read range to obtain the specific identification of the detected asset; determining the position of the radio frequency identification reader; associatively storing the obtained identification of the asset and the current position of the radio frequency identification reader, so as to obtain the information regarding the position of the asset.

The asset position detecting apparatus and method according to the present invention can use a small number of radio frequency identification reader to detect the exact positions of all the assets to be managed in the predetermined space, and after this detecting process, users can learn the association between the asset and its position by inquiring the database.

The asset position detecting apparatus and method provided by the present invention have the following advantages:

1. Low cost. According to the present invention, the position of the asset in the entire physical space can be detected by only a few movable radio frequency identification readers, without installing a fixed RFID reader array. On the other hand, the cost for installing, networking and maintaining is greatly reduced.

2. Easy to operate. The asset position detecting apparatus of the present invention is light and portable, so the operator can easily carry it moving around and the positions of the assets within the RFID read range are automatically updated by it. The detected asset-position information can be transferred to the backend computer system through a wireless network.

3. High flexibility and scalability. The configuration of the entire system can be varied with the circumstances. The adopted positioning technology can be changed according to environmental factors, accuracy requirement or cost consideration. The number of the asset position detecting apparatuses can also be adjusted to fit systems of different scales.

4. Rich functionality. The system can handle various kinds of inquiries about assets and their location. The user can search for assets or determine which assets are located at a certain position. Logs and reports as well as automatic notifications of the movement of assets can be generated to fulfill all kinds of business purposes.

5. Wide applicable scope. The asset position detecting apparatus and method of the present invention can be applied for supply chain, warehouses, libraries, retail stores and many other circumstances. It can cooperate with other information systems in these circumstances to improve the management capability greatly.

The present invention will be described in detail with reference to FIGS. 2-7. As the basic requirement for all the RFID-tagged asset managing systems, each asset to be managed is attached to an RFID tag. When the RFID tag is activated by the energy field of an RFID reader, it sends back to the reader a radio frequency signal with a predetermined specific ID (identification) code.

In the asset position detecting scheme proposed in the present invention, the particular position of an asset to be managed within a definite physical space, such as warehouses, libraries, and retail stores, can be detected by using only a small number of movable RFID readers to detect the RFID tags attached to the assets.

Figure 2:
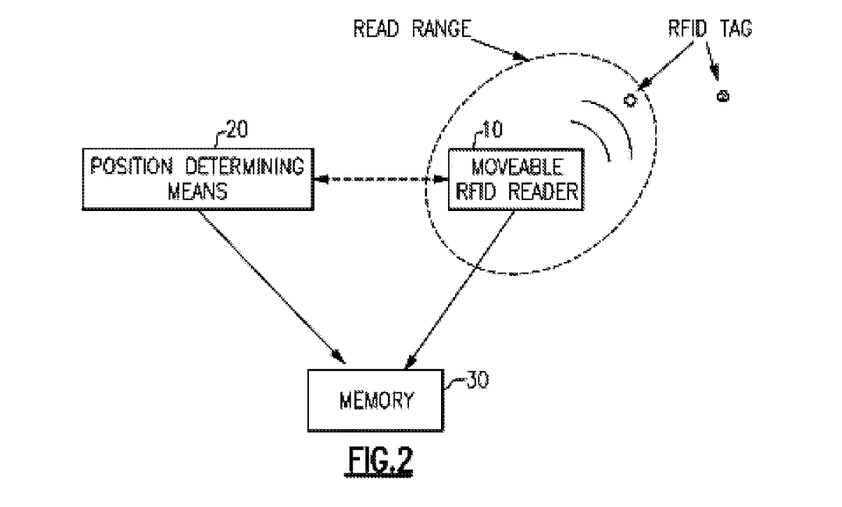
FIG. 2 shows a schematic block diagram of an asset position detecting apparatus according to the present invention.

FIG. 2 shows a schematic block diagram of an asset position detecting apparatus according to the present invention. As shown in FIG. 2, the asset position detecting apparatus according to the present invention includes a movable RFID reader 10 and a position determining means 20. The asset position detecting apparatus will be referred to as a mobile interrogator hereinafter. While the movable RFID reader 10 moves in the predetermined space range described above, it detects whether the assets to be managed exist in its read range, and reads the RFID tag attached to the asset within its read range, so as to obtain the specific ID for the detected asset. The position determining means 20 can be used to determine the position of the RFID reader itself. When the RFID reader detects that the asset exists in its read range, the obtained identification of the asset and the current position of the RFID reader are associatively stored in memory 30 to obtain the information regarding the position of the asset. Memory 30 may be memory inside the mobile interrogator, or memory in an apparatus outside the mobile interrogator, such as in a backend system. Alternatively, the position information can be temporarily stored in an internal memory of mobile interrogator, and then transferred to the memory of the apparatus outside the mobile interrogator.

Figure 3:
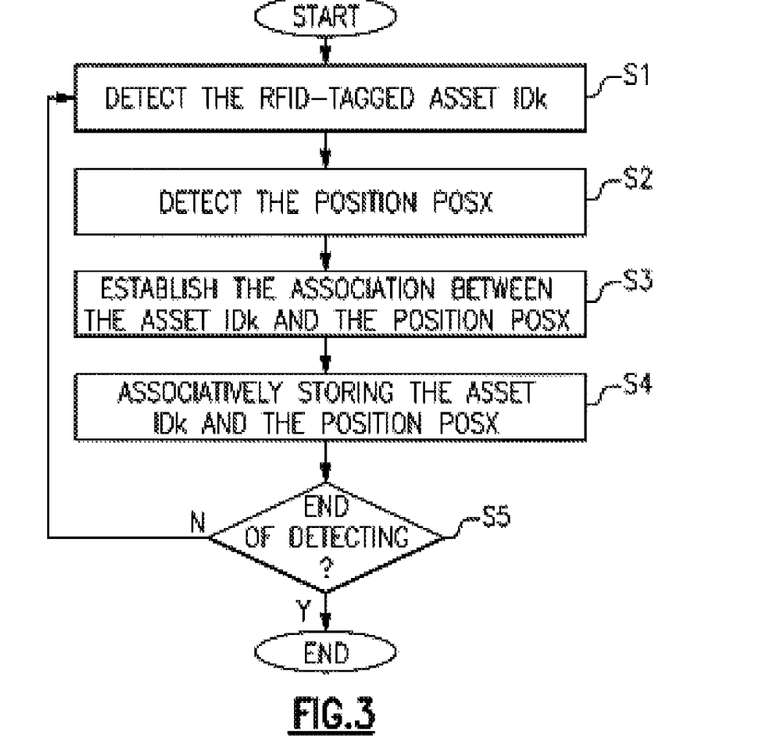
FIG. 3 shows a flow chart of the process of establishing the asset-position association according to the present invention.

The asset management system proposed in the present invention is a way of associating assets with their positions in the physical space by using the mobile interrogator. FIG. 3 shows a flow chart of the process of establishing the asset-position association according to the present invention.

At step S1, the mobile interrogator MIi detects the RFID-tagged asset IDk. When the RFID-tagged asset is detected, the attached RFID tag is read to obtain its identification IDk.

At step S2, the mobile interrogator MIi determines the position Posx of itself, especially the position of the movable RFID reader therein. It should be understood that, step S2 and the sequential operations can be performed only when the RFID-tagged asset is detected at step S1, or alternatively, the operation of step S2 also can be performed continuously regardless whether the RFID-tagged asset is detected at step S1.

At step S3, the association between the asset IDk and the position Posx determined when the asset IDk is detected is established, which means the asset IDk locates at position Posx and the deflection is the RFID read range R of the mobile interrogator.

At step S4, the asset IDk and the position Posx are associatively stored to establish the correspondence relation therebetween, so as to be used thereinafter.

Then at step S5, it is determined whether the detecting procedure ends. After scanning all positions in the predetermined space, or when the operator instructs to stop detecting, the detecting procedure ends. If it is determined that the detecting procedure does not end at step S5, the procedure returns to step S1 and continues detecting the RFID-tagged asset.

Figure 4:
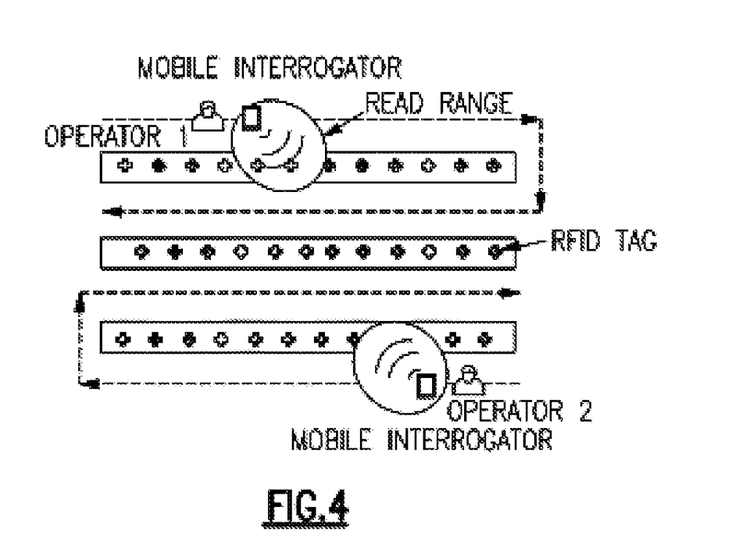
FIG. 4 shows a schematic diagram of the process in which the operator carries a mobile interrogator to perform scanning.

In order to associate all assets with their positions, one or more operators, for example operator 1 and operator 2, can carry the interrogator moving around the physical space, as shown in FIG. 4. FIG. 4 shows a schematic diagram of the process in which the operator carries a mobile interrogator to perform scanning. During the operator's moving, the RFID-tagged assets are detected by his mobile interrogator, and the positions of these assets are automatically updated. The scanning operation for associating assets with their positions may be performed by people as shown in FIG. 4. Alternatively, it may be performed by some automatic mechanisms, for example, it can be an automatic roaming vehicle carrying a mobile interrogator and moving around a warehouse. The initial scanning result is stored in a database of backend computer system. The later canning operation can be used to update the database or be compared with data already stored in database to find out which asset is moved to another position. The frequency of scanning operation may be variable according to different circumstances. Higher scanning frequency leads to a more up to date asset-position database.

After the association between assets and their positions is established, the backend computer system can provide a wide scope of the functionalities for assets management. Users can get an assets placement map of a physical space. They can query the position of a specific asset, or in the other way, query which assets are placed at a specific location. The system can monitor the assets movement, record the movement into a log, report and notify the position changes.

The system proposed in the present invention can be integrated with other asset information systems. For example, it can cooperate with supply chain information systems. The supply chain system manages the goods in stock and out of stock while the system proposed in the present invention provides the exact information of where the goods are specifically stored in the warehouse. Another example is to be integrated with a library information system. The common RFID-enabled library information system manages the information of a book, such as the title name, author, borrowed history etc., and maps each book to an RFID. Since the system proposed in the present invention can figure out the location of an RFID-tagged asset, the integration of the two systems can easily solve the problem where the book named "e-Business on Demand" is or whether it is placed on the right bookshelf.

An embodiment of the present invention will be described with reference to FIGS. 5-7. The asset management system in this embodiment of the present invention includes mobile interrogators and a backend computer system. There should be at least one mobile interrogator in the system. Mobile interrogators associate assets with their positions and the backend computer system communicates with mobile interrogators to maintain a database of the asset-position association. The backend computer system also provides management functions based on the database and handles interaction with users or other applications.

An example of a software module and a hardware configuration of the mobile interrogator will be described first. The mobile interrogator is a small, light device that can be carried by people or attached to some automatic moving mechanisms. It may be implemented as an integrated device or it can be implemented by a portable RFID reader and a common PDA (Personal Digital Assistant) running some specially designed software.

Figure 5:
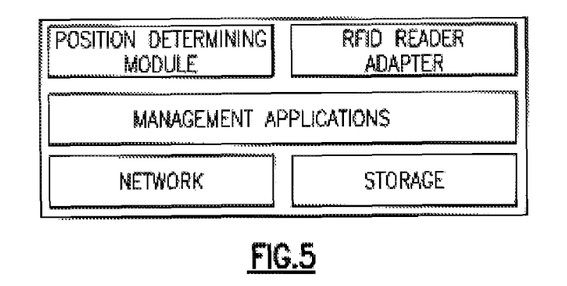
FIG. 5 shows the diagram of the example modules of a mobile interrogator.

FIG. 5 shows a diagram of the example modules of the mobile interrogator. The RFID Reader Adapter module works together with an RFID reader device and detects which RFID tag is within the coverage of the mobile interrogator. The RFID reader can be embedded in the mobile interrogator, or it can be an external apparatus which connects to the mobile interrogator via some industrial interfaces such as USB, RS232 etc.

The position determining module determines the position of the interrogator. There are various technologies for this purpose. For example, it may use GPS technology for out-door locating, or it may use WLAN (Wireless Local Area Network) based locating technology for in-door locating. And infrared ray, ultrasonic, and any other wireless or wired means may be exploited to determine the position of the interrogator. Another effective method is to attach special-purposed RFID tags (referred to as Position Reference Tag) to all known positions in the entire physical space and use the RFID reader device of the mobile interrogator to check which position reference tag can be detected, so as to determine the position of the mobile interrogator.

The network module enables the mobile interrogator to communicate with the backend computer system. The mobile interrogator sends the detected asset and its position to the backend system via the network module and fetches the position of an asset from the database of the backend system. The network function could be implemented with various wired or wireless technologies, while wireless technologies such as 802.11 are recommended.

The storage module can temporally store the asset-position association information established by the mobile interrogator. It can upload the stored information to the backend system at an appropriate time to synchronize the information stored in the backend system with the information stored in the storage module. The storage module also enables the mobile interrogator to download some part of the asset-position information from the backend system. In fact, the storage module is not indispensable for the mobile interrogator. The mobile interrogator may upload the asset-position association information to the backend system directly at any moment via the network module.

The mobile interrogator can also have a comparing module (which can also be referred as a comparator and is not shown in Figures) for comparing the detected asset-position pair with the data cached in the storage module to find out changes therein. Because this action does not involve network communication, the comparison speed is faster.

The management application module makes other modules work together. It triggers RFID reader adapter module to detect RFID tags and associate them with the positions determined by the position determining module. It uses the network module to initiate the information updating to the backend system and retrieve data from the backend system. It detects asset-position changes by comparing the newly detected information with the data retrieved from the network or the data cached in local storage. The management application module also provides a user interface for system operators.

Figure 6:
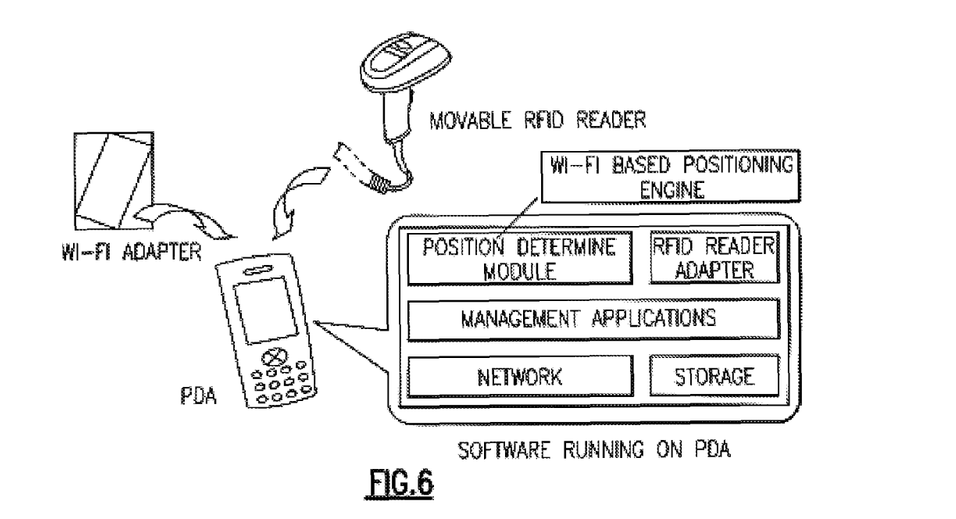
FIG. 6 shows an example implementation of the mobile interrogator.

FIG. 6 shows an example implementation of the mobile interrogator. In this example, the hardware of a mobile interrogator consists of an industrially available movable RFID reader, a Wi-Fi card, and a PDA. The software modules of the mobile interrogator are running on the PDA. Specially, the Wi-Fi adapter is used for both network communication and position determining. A Wi-Fi based positioning engine included in the position determining module calculates the Wi-Fi signal strength to get the position of the PDA.

An example of the backend management system will be described with reference to FIG. 7. The backend management system handles the interaction with the mobile interrogators, manages the asset-position database, and provides interfaces for business integration and user interaction.

Figure 7:
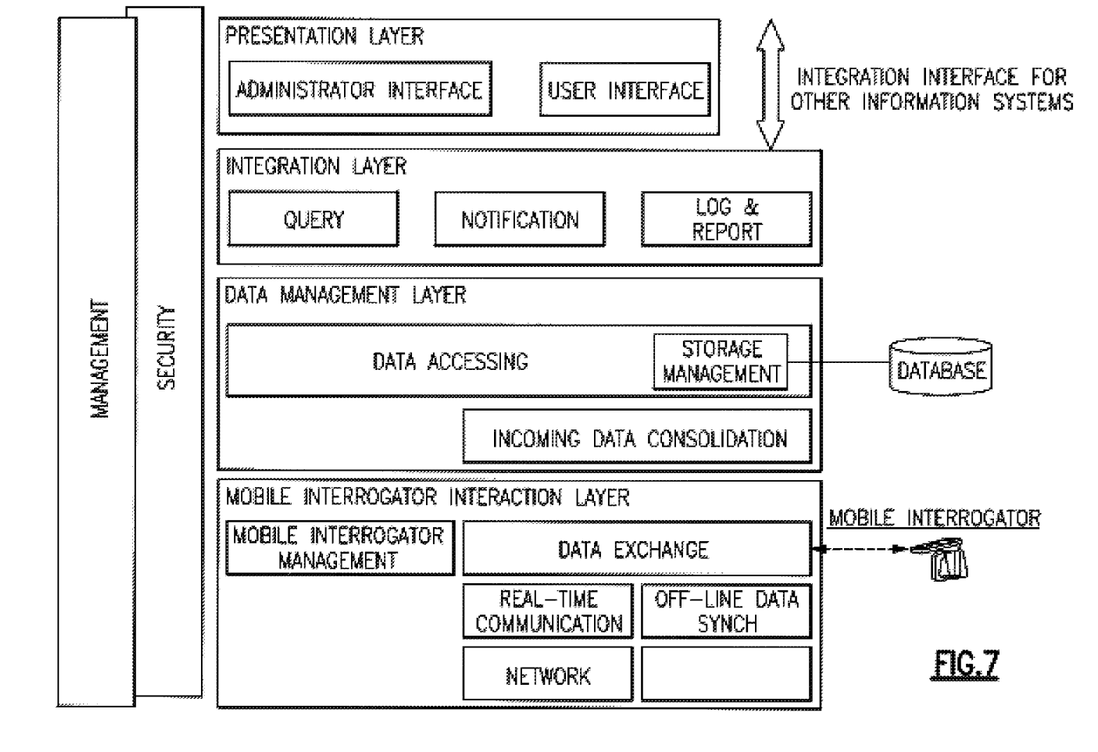
FIG. 7 shows the layered system architecture of a reference implementation scheme of the backend management system.

FIG. 7 shows the layered system architecture of a reference implementation scheme of the backend management system. The mobile interrogator interaction layer is the lowest layer of the backend management system. It handles the data exchange between the backend management system and the mobile interrogator, also monitors and manages the mobile interrogators. The mobile interrogator interaction layer builds an end-to-end communication with the data exchange module in two modes, that is, real-time communication mode and off-line data synchronization mode. Two corresponding modules are provided to support these two modes correspondingly. In real-time communication mode, the mobile interrogators transmit data to and retrieve data from the backend management system remotely at any time as needed. The real-time data transmission is made through networks. The network module in this layer handles the heterogeneity of underlying networks, such as Wi-Fi, Bluetooth and so on. In off-line data synchronization mode, the mobile interrogators are connected to the backend management system through some industrial computer interfaces such as USB, RS232, 1394, IR, etc. In this mode, the data stored in mobile interrogators can be synchronized with the backend system quickly. The peripheral interface module hides the heterogeneity of physical interfaces.

The mobile interrogator management module provides functions for monitoring and controlling mobile interrogators. The system administrator can access this module to check if a mobile interrogator is working properly. The administrator may query a mobile interrogator of its current position if it is working in real-time communication mode. The administrator may trace a mobile interrogator at real-time or get its roaming route history, with the help of the management application module running on the mobile interrogator. The administrator can permit or forbid the mobile interrogator to communicate with the backend management system.

A data management layer is in charge of storing, retrieving, and managing the asset position information reported by mobile interrogators. When new asset-position data are submitted from the mobile interrogator interaction layer, it is processed by the incoming data consolidation module at first. Since multiple mobile interrogators can work simultaneously, the position of one asset may be reported by different mobile interrogators for many times. The incoming data consolidation module will remove the redundancy data before delivering data to the data accessing module.

The data accessing module saves information reported to database by mobile interrogators and retrieves data from database as required. The storage management sub-module enables the system to support different kinds of database systems.

Integration layer provides functions for user interaction and integration with other information systems. Upper layer and other applications or systems access the integration layer to query the position of an asset or query the assets at a certain position. Notification can be generated according to timely schedules, events of the movement of certain assets or other specific rules. The integration layer also logs the changes of asset-position information of the system and provides reports of assets distribution within the managed physical space. The above logs and reports can be directed to or retrieved by other information systems. The integration layer exposes a service accessing interface for integration with other systems.

A presentation layer provides interfaces for users and/or administrators. The interface can be implemented with portalet, web pages or other applications. Users can access the functions provided by the integration layer through the interface. The administrator can use the administration interface to manage the entire system.

A management module and a security module are two cross-layer modules. Their functions should be implemented in each layer. The management module provides functions for system administrators to configure, control and monitor the running of the entire system. It may also expose a service accessing interface so that other management systems, such as Tivoli, can be used for administration and optimization. The security module authorizes users and applications to access the system and ensures that the data accessing and communication are performed in a secure way.

A demonstration of the layered structure of the backend management system of the present invention is described above, which is used to describe the present invention, but not to limit the present invention. It should be understood by those skilled in the art that such backend management system may be implemented in other manners.

Although the present invention has been shown and described in detail with reference to the advantageous embodiments of the present invention, it may be understood by those skilled in the art that various modifications in forms and details may be made without departing from the spirit and scope of the present invention as defined by the appended claims.

Variations described for the present invention can be realized in any combination desirable for each particular application. Thus particular limitations, and/or embodiment enhancements described herein, which may have particular advantages to the particular application need not be used for all applications. Also, not all limitations need be implemented in methods, systems and/or apparatus including one or more concepts of the present invention. The invention also includes apparatus for implementing steps of a method of this invention, and methods implementing functions of an apparatus of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. An asset management apparatus for determining existence of an asset having a radio frequency identification tag comprising;
   a mobile interrogator having a radio frequency identification reader initialized to have a predetermined space range;
   a detection means for examining said predetermined space range and check for existence of any asset; said detection means enabled to read any radio frequency identification tag attached to any asset within said read range;
   a position determining means to determine the position where said radio frequency identification reader itself is located and associatively storing obtained information regarding position of said asset in a memory location associated with said mobile interrogator;
   said mobile interrogator using said information from said associated memory to associate any assets with their position in a physical space; and
   a network module for enabling said mobile interrogator to communicate with said position determining means, such that when the radio frequency identification reader detects that said asset exists in said read range during movement of said reader, the obtained specific identification of said asset and a current position of said radio frequency identification reader are associatively stored in a memory using said network module, so as to obtain information regarding the position of said asset.

2. The asset position detecting apparatus according to claim 1, wherein said position determining means is a positioning means based on one of Global Position System, Wireless Local Area Network, infrared rays technology, and ultrasonic technology.

3. The asset position detecting apparatus according to claim 1, wherein position reference radio frequency identification tags representing position information are attached to a plurality of fixed positions in said predetermined space range, said position determining means determines the position of said radio frequency identification reader according to said fixed position of one position reference radio frequency identification tag read by said frequency identification reader.

4. The asset position detecting apparatus according to claim 1, further comprising a comparator to compare changes of newly detected asset position information with respect to previously obtained asset position information.

5. The asset position detecting apparatus according to claim 1, wherein said movable radio frequency identification reader is installed on a movable mechanism.

6. The asset position detecting method according to claim 1, wherein said position determining means is a wireless positioning means.

7. An asset management system for for assets having at least one attached radio frequency identification tag the method comprising:
   establishing a radio frequency range for a mobile interrogator;
   said mobile interrogator detecting an existing assets by searching said range for radio frequency identification tags said mobile interrogator employing a movable radio frequency identification reader;
   storing information about said identification tag if any asset is detected in a memory location associated with said mobile interrogator such that a physical correspondence can be established for said asset;
   associating said mobile interrogator to a network module so that information about said assets and their location can be processively transfeffed.

8. The asset position detecting method according to claim 7, wherein the step of determining comprises using a positioning scheme based on one of; a Global Position System, a wireless Local Area Network, infrared rays technology, and ultrasonic technology.

9. The asset position detecting method according to claim 7, wherein position reference radio frequency identification tags representing the position information are attached to a plurality of fixed positions in said predetermined space range, the step of determining being performed according to said position reference radio frequency identification tag read by said radio frequency identification reader.

10. The asset position detecting method according to claim 7, further comprising a step of comparing the newly detected asset position information with the previously obtained asset position information to find out the arising changes.

11. The asset position detecting method according to claim 7, further comprising a step of removing the redundancy information provided by the plurality of movable radio frequency identification readers.

12. The asset position detecting method according to claim 7, further comprising a step of updating the originally stored asset position information by using the newly detected asset position information.

13. An asset management system comprising:
a movable RFID reader to move in a predetermined space range to detect whether an asset to be managed exists in a read range of said reader, to read an RFID tag attached to the asset, and to obtain a specific identification of the detected asset;
said reader continuously searching for an asset until an asset hit has been found;
a position determining means to determine the position of the RFID reader
a memory to associatively store information regarding the position of the asset when the RFID reader detects that the asset exists in its read range, the obtained identification of the asset and the current position of the RFID reader; and
a backend computer system having a database of asset-position for storing information received by said mobile interrogator, said backend computer system also having management function for handling interaction with other applications and/or users.

14. An asset management system according to claim 13, further comprising means to associate a plurality of assets with positions of each asset as obtained by at least one of; at least one operators, an automatic mechanism, an automatic roaming vehicle carrying a mobile interrogator and moving around an asset warehouse.

15. An asset management system according to claim 14, further comprising a backend computer system to provide a wide scope of functionalities for management of said plurality of assets.

16. An asset management system according to claim 15, further comprising means to provide users with at least one of;

an assets placement map of a physical space of said asset warehouse;
a response to a query of the position of a specific asset; monitor data of asset movement,
a record of asset movement in a log; and
a report and notification of position changes.

17. An asset management system according to claim 13, wherein the apparatus is integrated with at least one other asset information system.

18. An asset management system according to claim 17, wherein said at least one other asset information system comprises a supply chain information system, said supply chain system manages goods stocking, and the apparatus provides information of where the goods are stored.

19. An asset management system according to claim 17, wherein said at least one other asset information system comprises a library information system which manages information of books, and said apparatus maps each book to an RFID tag.

20. An asset management system according to claim 19, further comprising a comparator to compare changes of newly detected asset position information with respect to previously obtained asset position information, and wherein said position determining means is a positioning means based on one of Global Position System, Wireless Local Area Network, infrared rays technology, and ultrasonic technology;
position reference radio frequency identification tags representing position information are attached to a plurality of fixed positions in said predetermined space range, said position determining means determines the position of said radio frequency identification reader according to said fixed position of one position reference radio frequency identification tag read by said radio frequency identification reader; and
said movable radio frequency identification reader is installed on a movable mechanism.

* * * * *